United States Patent
Marvit et al.

(10) Patent No.: US 8,108,392 B2
(45) Date of Patent: Jan. 31, 2012

(54) IDENTIFYING CLUSTERS OF WORDS ACCORDING TO WORD AFFINITIES

(75) Inventors: David L. Marvit, San Francisco, CA (US); Jawahar Jain, Los Altos, CA (US); Stergios Stergiou, Sunnyvale, CA (US); Alex Gilman, Fremont, CA (US); B. Thomas Adler, Santa Cruz, CA (US); John J. Sidorowich, Santa Cruz, CA (US)

(73) Assignee: Fujitsu Limited, Kawasaki (JP)

( * ) Notice: Subject to any disclaimer, the term of this patent is extended or adjusted under 35 U.S.C. 154(b) by 336 days.

(21) Appl. No.: 12/242,957

(22) Filed: Oct. 1, 2008

(65) Prior Publication Data

US 2009/0094207 A1     Apr. 9, 2009

Related U.S. Application Data

(60) Provisional application No. 60/977,811, filed on Oct. 5, 2007.

(51) Int. Cl.
 *G06F 17/30* (2006.01)
(52) U.S. Cl. ............................................ 707/737; 704/9
(58) Field of Classification Search ........................ None
 See application file for complete search history.

(56) References Cited

U.S. PATENT DOCUMENTS

| | | | |
|---|---|---|---|
| 6,484,168 B1 | 11/2002 | Pennock et al. | |
| 6,510,436 B1 * | 1/2003 | Hart | 707/737 |
| 6,772,170 B2 | 8/2004 | Pennock et al. | |
| 7,792,858 B2 * | 9/2010 | Tang et al. | 707/780 |
| 2003/0217335 A1 * | 11/2003 | Chung et al. | 715/514 |
| 2003/0236582 A1 * | 12/2003 | Zamir et al. | 700/94 |
| 2005/0203924 A1 * | 9/2005 | Rosenberg | 707/100 |
| 2006/0212294 A1 * | 9/2006 | Gorin et al. | 704/245 |
| 2007/0288602 A1 * | 12/2007 | Sundaresan | 709/219 |
| 2008/0082520 A1 | 4/2008 | Bohn et al. | |
| 2008/0114779 A1 * | 5/2008 | Friedlander et al. | 707/100 |

FOREIGN PATENT DOCUMENTS

| | | |
|---|---|---|
| EP | 1 304 627 A2 | 4/2003 |
| EP | 1 705 645 A2 | 9/2006 |

OTHER PUBLICATIONS

Tamoto, Masafumi et al., "*Clustering Word Category Based on Binomial Posteriori Co-Occurrence Distribution*", Acoustics, Speech, and Signal Processing, 0-7803-2431-5/95, pp. 165-168, May 9, 1995.

Schütze, Hinrich, et al., "*A Cooccurrence-Based Thesaurus and Two Applications to Information Retrieval*", Information Processing & Management, vol. 33, No. 3, © Elsevier Science Ltd., 0306-4573/97, pp. 307-318, May 1, 1997.

(Continued)

*Primary Examiner* — Mohammad Ali
*Assistant Examiner* — Syed H Hasan
(74) *Attorney, Agent, or Firm* — Baker Botts L.L.P.

(57) ABSTRACT

In one embodiment, identifying clusters of words includes accessing a record that records affinities. An affinity between a first and second word describes a quantitative relationship between the first and second word. Clusters of words are identified according to the affinities. A cluster comprises words that are sufficiently affine with each other. A first word is sufficiently affine with a second word if the affinity between the first and second word satisfies one or more affinity criteria. A clustering analysis is performed using the clusters.

22 Claims, 4 Drawing Sheets

OTHER PUBLICATIONS

Isogai, Shuntaro, et al., "*Multi-Class Composite N-gram Language Model Using Multiple Word Clusters and Word Successions*", Eurospeech 2001-Scandinavia, 4 pages, 2001.

Chen, Libo, et al., "*Increasing the Customer's Choice: Query Expansion based on the Layer-Seeds Method and its Application in E-Commerce*", Proceedings of the 2004 IEEE International Conference on e-Technology, e-Commerce and e-Service, 0-7695-2073-1/04, 8 pages, Mar. 28, 2004.

Momtazi, S., et al., "*A Pos-Based Fuzzy Word Clustering Algorithm for Continuous Speech Recognition Systems*", IEEE, 1-4244-0779-6/07, 4 pages, Feb. 12, 2007.

Communication from the European Patent Office, European Search Report for European Patent Application No. 08165809.8-1527, 7 pages, Jan. 26, 2009.

U.S. Appl. No. 12/243,267, by inventors David L. Marvit et al., entitled "Modeling Topics Using Statistical Distributions,", 52 pages filed, Oct. 1, 2008.

Li, Hang, et al., "*Topic analysis using a finite mixture model*", Information Processing and Management, vol. 39, No. 4, pp. 521-541, Jul. 1, 2003.

European Patent Office Communication, European Search Report and Annex to the European Search Report; Application No. EP 08 16 5836; Ref. P111733EP00/CLH; 5 pages, Aug. 4, 2009.

The State Intellectual Property Office of China, First Notification of Office Action, Patent Application No. 200810166172.0, 14 pages, Aug. 10, 2010.

The State Intellectual Property Office of China, First Notification of Office Action, Patent Application No. 200810166171.6, Chinese Office Action and English Translation, 13 pages, Nov. 9, 2010.

The State Intellectual Property Office of China, 2nd Notification of Office Action, Patent Application No. 200810166171.6, Chinese Office Action and English Translation, 11 pages, Apr. 13, 2011.

Marvit, U.S. Appl. No. 12/243,267, Non-Final Office Action mailed by the U.S. Patent and Trademark office on Apr. 18, 2011, 20 pages.

\* cited by examiner

| | $w_1$ DOG | $w_2$ FOREST | $w_3$ TREE | $w_4$ GRAPHICS | $w_5$ COMPUTER |
|---|---|---|---|---|---|
| | | | | | |
| $w_0$ BINARY | 0.003 | 0.005 | 0.037 | 0.021 | 0.066 |
| $w_1$ DOG | | 0.024 | 0.033 | 0.017 | 0.049 |
| $w_2$ FOREST | | | 0.092 | 0.004 | 0.052 |
| $w_3$ TREE | | | | 0.042 | 0.056 |
| $w_4$ GRAPHICS | | | | | 0.222 |

|   | $w_0$ BINARY | $w_1$ DOG | $w_2$ FOREST | $w_3$ TREE | $w_4$ GRAPHICS | $w_5$ COMPUTER |
|---|---|---|---|---|---|---|
| $w_0$ BINARY | 1 | 0.004 | 0.005 | 0.016 | 0.020 | 0.037 |
| $w_1$ DOG | 0.018 | 1 | 0.022 | 0.026 | 0.016 | 0.047 |
| $w_2$ FOREST | 0.013 | 0.013 | 1 | 0.055 | 0.008 | 0.026 |
| $w_3$ TREE | 0.071 | 0.029 | 0.102 | 1 | 0.034 | 0.060 |
| $w_4$ GRAPHICS | 0.071 | 0.013 | 0.012 | 0.026 | 1 | 0.255 |
| $w_5$ COMPUTER | 0.360 | 0.112 | 0.103 | 0.128 | 0.716 | 1 |

|   | WORD 1 | WORD 2 | WORD 3 | [...] | WORD 50,000 |
|---|---|---|---|---|---|
| WORD 1 | ----- | 0.005 | 0.037 | [...] | 0.066 |
| WORD 2 |  | ----- | 0.033 | [...] | 0.049 |
| WORD 3 |  |  | ----- | [...] | 0.052 |
| [...] |  |  |  | ----- | [...] |
| WORD 50,000 |  |  |  |  | ----- |
| AVERAGE | AA1 | AA2 | AA3 | [...] | AA50,000 |

*FIG. 5*

IDENTIFYING CLUSTERS OF WORDS ACCORDING TO WORD AFFINITIES

RELATED APPLICATION

This application claims benefit under 35 U.S.C. §119(e) of U.S. Provisional Application Ser. No. 60/977,811, titled "WORD CLUSTERING BASED ON AFFINITY," filed Oct. 5, 2007, by David (nmi) Marvit et al.

TECHNICAL FIELD

The present invention relates generally to lexigraphical analysis and, more particularly, to identifying clusters of words according to word affinities.

BACKGROUND

A corpus of data may hold a large amount of information, yet finding relevant information may be difficult. Keyword searching is the primary technique for finding information. In certain situations, however, keyword searching is not effective in locating information.

BRIEF DESCRIPTION OF THE FIGURES

FIG. 4 illustrates an example of an affinity matrix that records directional affinities;

FIG. 5 illustrates an example of an affinity matrix that records average affinities;

DETAILED DESCRIPTION

Overview

Figure 1:
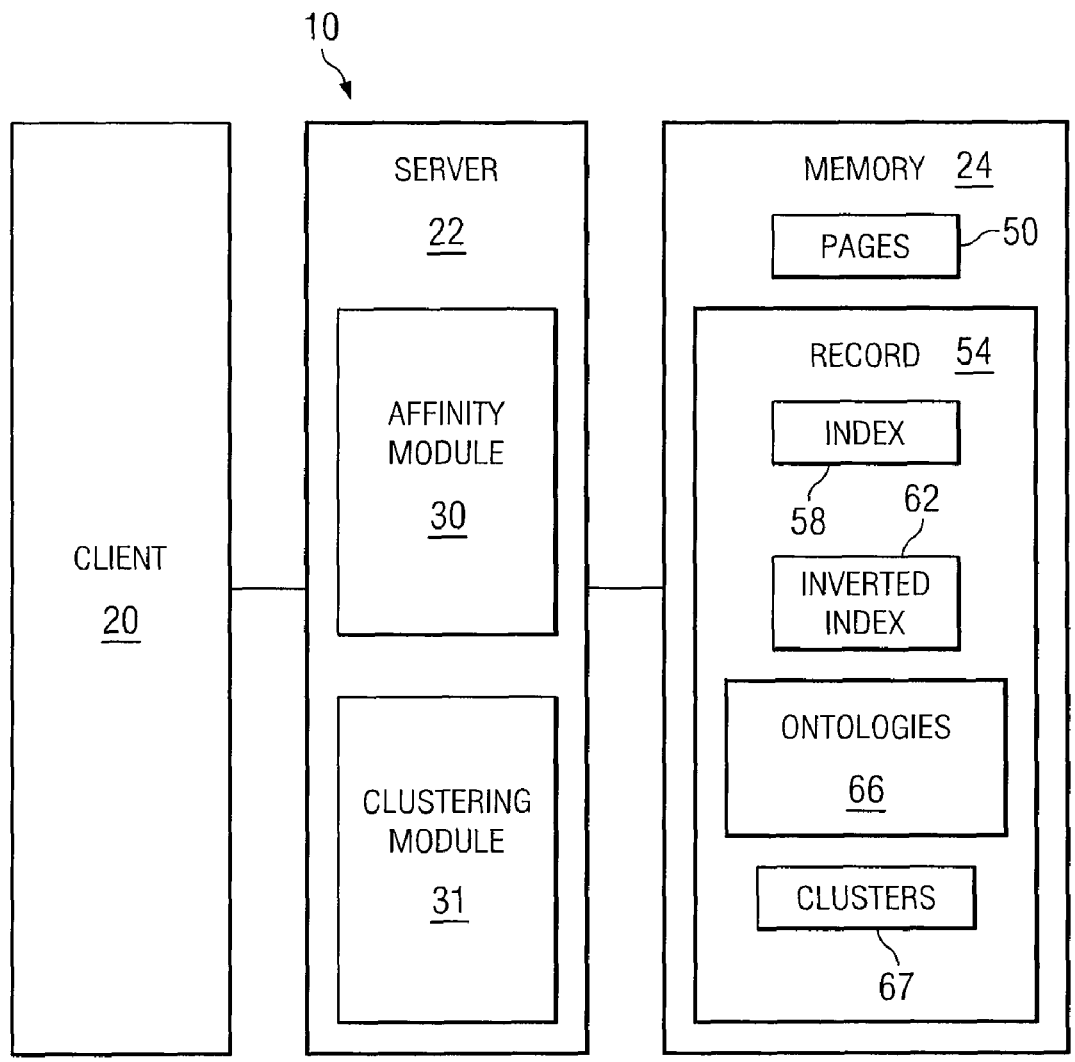
FIG. 1 illustrates one embodiment of a system that generates an ontology of a language from the affinities between the words of the language.

In one embodiment, identifying clusters of words includes accessing a record that records affinities. An affinity between a first and second word describes a quantitative relationship between the first and second word. Clusters of words are identified according to the affinities. A cluster comprises words that are sufficiently affine with each other. A first word is sufficiently affine with a second word if the affinity between the first and second word satisfies one or more affinity criteria. A clustering analysis is performed using the clusters.

Example Embodiments

In particular embodiments, creating and querying a domain ontology may include the following:

1. Collect documents in a domain. In particular embodiments, a document is a collection of terms. A document may comprise readable text, for example, a book of the New Testament. A document need not comprise text in narrative form, for example, a document may comprise a set of user-entered tags that individually and collectively describe the content of an image. A collection of documents may be referred to as a "domain corpus."

2. Identify the terms of interest ("dictionary terms") in the domain. Examples of terms include a word (such as "tree"), a phrase (such as "graph algorithm"), a named entity (such as "New York"), etc. A term (or concept) may have different forms. In certain cases, different words are used for the same concept, for example, "kidney stones" and "kidney calculi" refer to the same concept, "kidney stones." In other cases, a word stem may have many inflected variants, for example, the word stem "tree" has inflected variants "tree" and "trees." In particular embodiments, forms of the same term may be treated as mapped to the same term. Any suitable form of a dictionary term may appear in a document, but the particular dictionary term need not appear in any document.

Examples of methods for identifying dictionary terms include using a human-generated dictionary for a specific domain, for example, a medical dictionary. In particular embodiments, a list of dictionary terms may be automatically generated from a set of strings of text in a corpus. The strings may be indexed and sorted by frequency, and strings with frequency above a threshold may be selected. Other suitable statistical method may be used to determine terms. In particular embodiments, "word" may be interchangeable with "term" and "dictionary term."

3. Calculate the number of co-occurrences of dictionary terms in a given co-occurrence context. Two terms co-occur if they each appear at least once within the same co-occurrence context. Examples of co-occurrence contexts include a document and a paragraph.

4. Create a directed weighted graph that comprises the domain ontology. The directed weighted graph includes dictionary terms as the nodes and affinities as the weights of the edges. "Directed weighted graph" may be used as the actual representation of the same information that can be represented by any suitable data structure, e.g., a matrix, a Binary Decision Diagram, or a collection of Binary Decision Diagrams.

5. Apply a procedure to query the directed weighted graph. Given one or more dictionary terms as input, the procedure outputs one or more dictionary terms related to the input dictionary terms. For example, the procedure may outputs a sorted list of one or more terms that have the highest differential directional affinity (described below) towards one or more input terms. In this case, the output includes terms that are more closely related to the input terms, in relation to the domain that the ontology addresses.

Any suitable definitions of affinity may be used. In particular embodiments, the following may be used:

1. Basic Affinity a. The basic affinity (A) between terms A and B may be defined as the ratio of the number of co-occurrence contexts that include both terms A and B over the number of co-occurrence contexts that include either of the terms A or B:

$A(A,B) = |AB|/|A \text{ or } B|$ b. The basic affinity (A) between terms A and B may also be defined as the ratio of the number of co-occurrence contexts that include both terms A and B over the maximum of either the number of co-occurrence contexts that include A or the number of co-occurrence contexts that include B:

$A(A,B) = |AB|/\max(|A|,|B|)$

2. Directional Affinity

The directional affinity (DAff) between terms A and B may be defined as the conditional probability of observing B, given that A was observed in a co-occurrence context:

$\text{DAff}(A, B) = |AB|/|A|$

That is, directional affinity may be the number of co-occurrence contexts that include both terms A and B, over the number of co-occurrence contexts that include term A. Generally, DAff(A,B) differs from DAff(B,A).

3. Differential Directional Affinity

The differential directional affinity (DiffDAff) between terms A and B may be defined as the directional affinity between terms A and B minus a factor that accounts for the common-ness of the term B in the corpus. The common-ness of the term B in the corpus may be a statistical value over the basic affinity or directional affinity values of the term B towards the other terms in the corpus. In particular embodiment, the common-ness of the term B in a corpus may be the average affinity (AA) of term B, which yields the following definition of differential directional affinity:

$$DiffDAff(A,B)=DA(A,B)-AA(B)$$

The average affinity (AA), or average directional affinity, of a term B may be defined as:

$$AA(B)=AVERAGE\_x\ DAff(x, B)$$

That is, average affinity may be the average of the directional affinities of a term B over the other terms in the co-occurrence contexts.

FIG. 1 illustrates one embodiment of a system 10 that identifies clusters of words. In particular embodiments, system 10 identifies clusters of words from the affinities between the words. A cluster includes words that are sufficiently affine with each other, where sufficient affinity is determined according to one or more affinity criteria. In particular embodiments, system 10 performs a clustering analysis. Examples of clustering analyses include categorizing a page according to the clusters of the page, determining a character of a corpus from the clusters of the corpus, and analyzing users based on the clusters in the users' documents.

In certain embodiments, directional affinity may be calculated on a specific inverted index II for a given subset of words and a dictionary D, where index II includes, for example, entries $I(w_i)$ and $I(w_j)$ for words $w_i$ and $w_j$. In general, an inverted index is an index data structure that stores mappings from a term to its locations, that is, the co-occurrence contexts in which a term appears. For each pair of words $w_i$ and $w_j$ in D, DA(i,j) may be defined as the values in the conjunction of entries $I(w_i),I(w_j)$ in II divided by the number of values in $I(w_i)$. In general, DA(i,j) is not necessarily equal to DA(j,i). The results may be stored in any suitable manner, for example, row-wise, where the D(1,i) are stored, then the D(2,j) are stored, and so on. For each row i, $|I(w_i)|$ may be stored, followed by the cardinalities of the conjunctions with the $w_j$.

In certain embodiments, directional affinity may be calculated in three phases. In the embodiments, each dictionary term is assigned a unique integer identifier. The entries of an inverted index correspond to the integer identifiers. In Phase 0, the II entries corresponding to D are read. For parameters (s, o), only the element identifiers that are of the form ks+o are kept. The value ks+o defines a subset of the II entries to be examined. In this manner, directional affinities can be computed in parallel. As an example, the result from parameters s,o (1,0) is equivalent to the one obtained from the merging of the computations with parameters (3,0), (3,1), (3,2). This step allows calculation of DA tables for very large inverted indices.

In Phase 1, the conjunctions are calculated row-wise only for DA(i,j). In Phase 2, the calculated upper-triangular UT DA array is read. From that, the lower-triangular part is obtained as the transpose of UT. In certain embodiments, multiple DA arrays of the same dimension may be merged into a single array. A DA array on a large II can be calculated as the $sum_{i=0..(s-1)}$ DA with parameters (s, i). Additional information may be stored with the calculated conjunctions so that directional affinities can be computed. In certain cases, the cardinalities of the II entries may be stored.

In certain embodiments, the DA may be stored row-wise, so the calculation of the AA entries may proceed in parallel with the calculation of the DA entries. In particular, AA may be generated by summing up the rows of the DA as they are read from the disk and, at the end, normalized by the number of the dictionary entries.

In the illustrated embodiment, system 10 includes a client 20, a server 22, and a memory 24. Client 20 allows a user to communicate with server 22 to generate ontologies of a language. Client 20 may send user input to server 22, and may provide (for example, display or print) server output to user. Server system 24 manages applications for generating ontologies of a language. Memory 24 stores data used by server system 24.

In the illustrated embodiment, memory 24 stores pages 50 and a record 54. A page 50 (or document or co-occurrence context) may refer to a collection of words. Examples of a page 50 include one or more pages of a document, one or more documents, one or more books, one or more web pages, correspondence (for example, email or instant messages), and/or other collections of words. A page 50 may be identified by a page identifier. A page 50 may be electronically stored in one or more tangible computer-readable media. A page 50 may be associated with any suitable content, for example, text (such as characters, words, and/or numbers), images (such as graphics, photographs, or videos), audio (such as recordings or computer-generated sounds), and/or software programs. In certain embodiments, a set of pages 50 may belong to a corpus. A corpus may be associated with a particular subject matter, community, organization, or other entity.

Record 54 describes pages 50. In the embodiment, record 54 includes an index 58, an inverted index 62, ontologies 66, and clusters 67. Index 58 includes index lists, where an index list for a page 50 indicates the words of the page 50. Inverted index 62 includes inverted index lists, where an inverted index list for a word (or set of words) indicates the pages 50 that include the word (or set of words). In one example, list $W_i$ includes page identifiers of pages 50 that include word $w_i$. List $W_i$ & $W_j$ includes page identifiers of conjunction pages 50 that include both words $w_i$ and $w_j$. List $W_i+W_j$ includes page identifiers of disjunction pages 50 that include either word $w_i$ or $w_j$. $P(W_i)$ is the number of pages 50 of $W_i$, that is, the number of pages 50 that include word $w_i$.

In one embodiment, a list (such as an index list or an inverted index list) may be stored as a binary decision diagram (BDD). In one example, a binary decision diagram $BDD(W_i)$ for set $W_i$ represents the pages 50 that have word $w_i$. The satisfying assignment count $Satisf(BDD(W_i))$ of a $BDD(W_i)$ yields the number $P(W_i)$ of pages 50 that have word $w_i$:

$$P(W_i)=Satisf(BDD(W_i))$$

Accordingly, $$P(W_i\ \&\ W_j)=Satisf(BDD(W_i)\ AND\ BDD(W_j))$$

$$P(W_i+W_j)=Satisf(BDD(W_i)\ OR\ BDD(W_j))$$

Ontologies 66 represent the words of a language and the relationships among the words. In one embodiment, an ontology 66 represents the affinities between words. In the illustrated example, ontologies 66 include an affinity matrix and an affinity graph. Examples of affinity matrices are described with the reference to FIGS. 3 through 5. An example of an affinity graph is described with reference to FIG. 6. Clusters 67 record clusters of words that are related to each other. Clusters are described in more detail with reference to FIG. 7.

In the illustrated embodiment, server 22 includes an affinity module 30 and a clustering module 31. Affinity module 30 may calculate affinities for word pairs, record the affinities in an affinity matrix, and/or report the affinity matrix. Affinity module 30 may also generate an affinity graph. Affinity module 30 is described in more detail with reference to FIG. 2.

In particular embodiments, clustering module 31 may discover patterns in data sets by identifying clusters of related elements in the data sets. In particular embodiments, clustering module 31 may identify clusters of a set of words (for example, a language or a set of pages 50). In general, words of a cluster are highly related to each other, but not to words outside of the cluster. A cluster of words may designate a theme (or topic) of the set of words. In particular embodiments, clustering module 31 identifies clusters of related words according to the affinities among the words. In the embodiments, words of a cluster are highly affine to each other, but not to words outside of the cluster. Clustering module 31 is described in more detail with reference to FIG. 7.

A component of system 10 may include an interface, logic, memory, and/or other suitable element. An interface receives input, sends output, processes the input and/or output, and/or performs other suitable operation. An interface may comprise hardware and/or software.

Logic performs the operations of the component, for example, executes instructions to generate output from input. Logic may include hardware, software, and/or other logic. Logic may be encoded in one or more tangible media and may perform operations when executed by a computer. Certain logic, such as a processor, may manage the operation of a component. Examples of a processor include one or more computers, one or more microprocessors, one or more applications, and/or other logic.

A memory stores information. A memory may comprise one or more tangible, computer-readable, and/or computer-executable storage medium. Examples of memory include computer memory (for example, Random Access Memory (RAM) or Read Only Memory (ROM)), mass storage media (for example, a hard disk), removable storage media (for example, a Compact Disk (CD) or a Digital Video Disk (DVD)), database and/or network storage (for example, a server), and/or other computer-readable medium.

Modifications, additions, or omissions may be made to system 10 without departing from the scope of the invention. The components of system 10 may be integrated or separated. Moreover, the operations of system 10 may be performed by more, fewer, or other components. For example, the operations of generators 42 and 46 may be performed by one component, or the operations of affinity calculator 34 may be performed by more than one component. Additionally, operations of system 10 may be performed using any suitable logic comprising software, hardware, and/or other logic. As used in this document, "each" refers to each member of a set or each member of a subset of a set.

Modifications, additions, or omissions may be made to the examples of the matrices without departing from the scope of the invention. A matrix may include more, fewer, or other values. Additionally, the values of the matrix may be arranged in any suitable order.

Figures 2, 3:
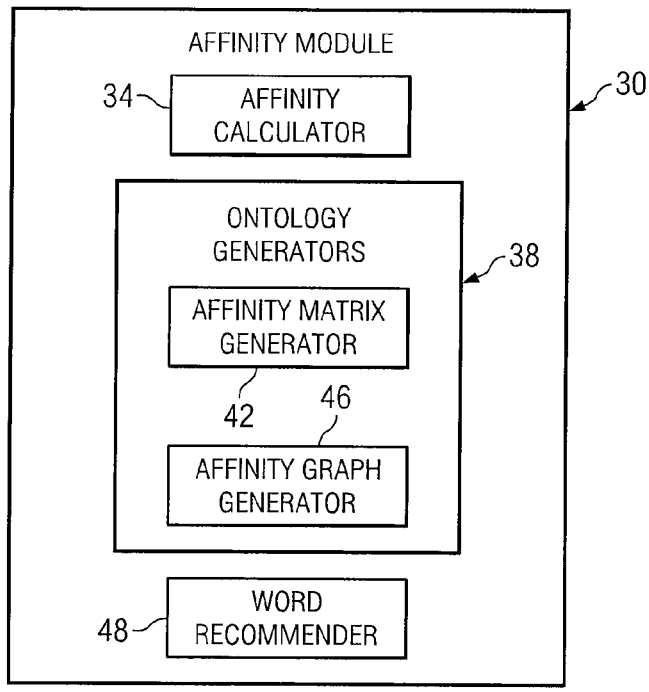
FIG. 2 illustrates one embodiment of an affinity module that may be used with the system of FIG. 1.
FIG. 3 illustrates an example of an affinity matrix that records basic affinities.

FIG. 2 illustrates one embodiment of affinity module 30 that may be used with system 10 of FIG. 1. Affinity module 30 may calculate an affinity for a word pair, record the affinity in an affinity matrix, and/or report the affinity matrix. Affinity module 30 may also generate an affinity graph.

In the illustrated embodiment, affinity module 30 includes an affinity calculator 34, ontology generators 38, and a word recommender 48. Affinity calculator 34 calculates any suitable type of affinity for a word $w_i$ or for a word pair comprising a first word $w_i$ and a second word $w_j$. Examples of affinities include a basic, directional, average, differential, and/or other affinity.

In one embodiment, word recommender 48 receives a seed word and identifies words that have an affinity with the seed word that is greater than a threshold affinity. The threshold affinity may have any suitable value, such as greater than or equal to 0.25, 0.5, 0.75, or 0.95. The threshold affinity may be pre-programmed or user-designated.

A basic affinity may be calculated from the amount (for example, the number) of pages 50 that include words $w_i$ and/or $w_j$. The conjunction page amount represents the amount of pages 50 that include both word $w_i$ and word $w_j$, and the disjunction page amount represents the amount of pages 50 that include either word $w_i$ or word $w_j$. The basic affinity may be given by the conjunction page amount divided by the disjunction page amount. In one example, a number of conjunction pages indicates the number of pages comprising word $w_i$ and word $w_j$, and a number of disjunction pages indicates the number of pages comprising either word $w_i$ or word $w_j$. The basic affinity may be given by the number of conjunction pages divided by the number of disjunction pages:

$$\text{Affinity}(w_i, w_j) = P(W_i \& W_j)/P(W_i + W_j)$$

FIG. 3 illustrates an example of an affinity matrix 110 that records basic affinities. In the illustrated example, affinity matrix 110 records the pairwise affinities of words $w_1, \ldots, w_5$. According to affinity matrix 110, the affinity between words $w_0$ and $w_1$ is 0.003, between words $w_0$ and $w_2$ is 0.005, and so on.

Referring back to FIG. 1, an affinity group includes word pairs that have high affinities towards each another, and may be used to capture the relationship between words $w_1$ and $w_2$ with respect to page content. A high affinity may be designated as an affinity over an affinity group threshold. A threshold may be set at any suitable value, such as greater than or equal to 0.50, 0.60, 0.75, 0.90, or 0.95. A word may belong to more than one affinity group. In one embodiment, an affinity group may be represented as a BDD. The pointer for the BDD may be stored with each word of the group in inverted index 62.

A directional affinity may be used to measure the importance of word $w_i$ with respect to word $w_j$. Affinity calculator 34 calculates the directional affinity of word $w_i$ given word $w_j$ from the amount (for example, the number) of pages 50 that include words $w_i$ and $w_j$. A word $w_j$ page amount represents the amount of pages 50 that include word $w_i$. The directional affinity of word $w_i$ given word $w_j$ may be given by the conjunction page amount divided by word $w_j$ page amount. For example, a number of word $w_j$ pages indicates the number of pages 50 that include word $w_i$. The directional affinity of word $w_i$ given word $w_j$ may be given by the number of conjunction pages 50 divided by number of word $w_i$ pages 50:

$$\text{DAffinity}(w_i, w_j) = P(W_i \& W_j)/P(W_i)$$

DAffinity($w_i$, $w_j$) is not the same as DAffinity($w_j$, $w_i$). A high directional affinity DAffinity($w_i$, $w_j$) between words $w_i$ and $w_j$ indicates a higher probability that a page 50 includes word $w_i$ given that the page 50 includes word $w_j$. In one example, pages [1 2 3 4 5 6] include word $w_i$, and pages [4 2] include word $w_j$. The pages that include word $w_j$ also include word $w_i$, so from the viewpoint of word $w_j$, word $w_i$ is of high importance. Only in one-third the pages that include $w_i$ also include word $w_j$, so from the viewpoint of word $w_i$, word $w_j$ is of low importance.

FIG. 4 illustrates an example of an affinity matrix 120 that records the directional affinities for words $w_0, \ldots, w_5$. In the example, words 124 are A words, and words 128 are B words. The rows of matrix 120 record the affinity of a B word given an A word, and the columns of affinity matrix 120 record the affinity of an A word given a B word.

Referring back to FIG. 1, the average affinity of a word $w_i$ calculated with respect to the other words $w_j$. In one embodiment, the average affinity may be the average of the affinities between word $w_i$ and every other word $w_j$. The average affinity of word $w_i$ of N words may be given by:

$$AveAff(w_i) = \frac{1}{N} \sum_{j=1}^{N} P(w_i \mid w_j)$$

FIG. 5 illustrates an example of an affinity matrix 140 that records average affinities. Rows 142 record basic affinities for word 1 through word 50,000. Row 144 records the average affinities of word 1 through word 50,000.

Referring back to FIG. 1, the average affinity of a word may indicate the depth of the word. A word with a lower average affinity may be regarded as a deeper word, and a word with a higher average affinity may be regarded as a shallower word. Deeper words tend to be more technical, specific, and precise. A page 50 with a higher percentage of deeper words may be regarded as a deeper page, and a page 50 with a lower percentage of deeper words may be regarded as a shallower page. In one embodiment, a user may specify the depth of word and/or pages 50 to be retrieved.

The deeper words of a page 50 may form one or more clusters of highly related words. A cluster may represent a common idea, or theme. The number of themes of a page 50 may indicate the specificity of the page 50. A page 50 with fewer themes may be regarded as more specific, and a page 50 with more themes may be regarded as less specific.

The differential affinity for word $w_i$ with respect to word $w_j$ is the directional affinity between words $w_i$ and $w_j$ minus the average affinity of word $w_j$ for all other words. Differential affinity may be expressed as:

DiffAff($w_i$, $w_j$)=DAffinity($w_i$, $w_j$)–AveAff($w_j$)

Differential affinity removes the bias caused by the general tendency for word $w_j$ to occur in pages 50. In particular circumstances, differential affinity may provide a more accurate indication of the probability that a page includes word $w_i$ given that the page includes word $w_j$.

Differential affinities may be used in a variety of applications. In one example, differential affinities among people's names may be used to study social networking. In another example, differential affinities among language elements may be used to study natural language processing. In another example, differential affinities among products may be used to study marketing.

Affinity calculator 34 may use any suitable technique to search inverted index lists to calculate affinities. For example, to identify pages that include both words $w_i$, and $w_j$, affinity calculator 34 may search list $W_i$ of word $w_i$ and list $W_j$ of word $w_j$ for common elements, that is, common page identifiers.

In particular embodiments, an ontology generator 38 generates an ontology 66 of a language, such as an affinity matrix or an affinity graph. An ontology may be generated from any suitable affinity, such as a basic, directional, average, differential, and/or other affinity. Ontologies 66 may be generated from words selected from a language in any suitable manner. For example, words from a commonly used portion of the language or words related to one or more particular subject matter areas may be selected.

In the illustrated embodiment, ontology generators 38 include an affinity matrix generator 42 and an affinity graph generator 46. Affinity matrix generator 42 generates an affinity matrix that records affinities between words. Affinity graph generator 46 generates an affinity graph that represents affinities between words. In an affinity graph, a node represents a word, and the weight of the directed edge between nodes represents the affinity between the words represented by the nodes. An affinity graph may have any suitable number of dimensions.

Figure 6:
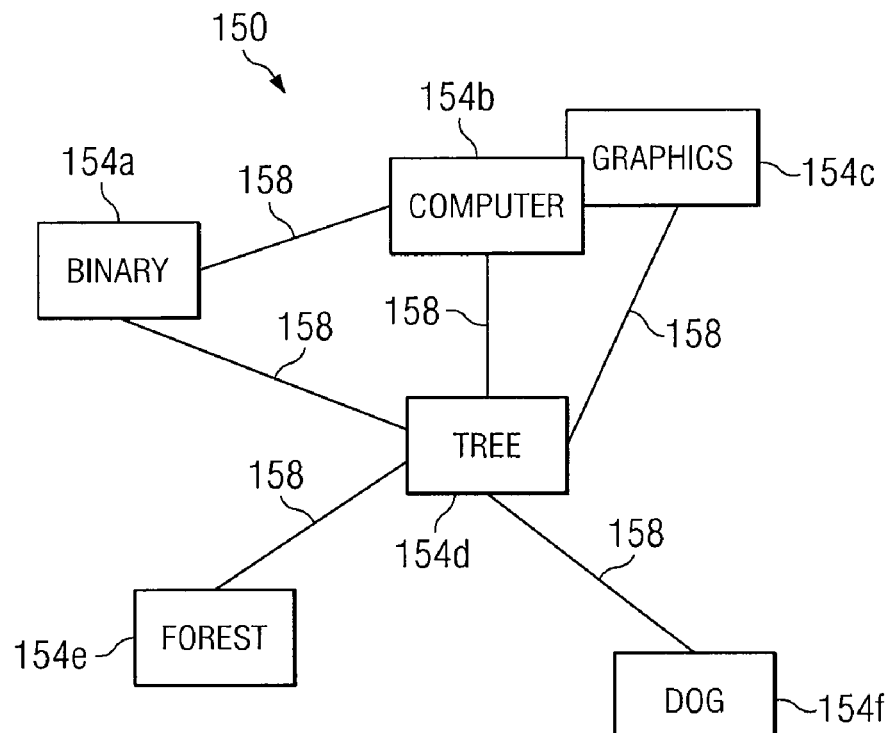
FIG. 6 illustrates an example of an affinity graph.

FIG. 6 illustrates an example of an affinity graph 150. Affinity graph 150 includes nodes 154 and links 158. A node 154 represents a word. In the example, node 154a represents the word "binary." The weight of the directed edge between nodes between nodes 154 represents the affinity between the words represented by nodes 154. For example, a greater weight represents a greater affinity. A link 158 between the nodes indicates that the affinity between the words represented by the nodes 154 is above an affinity threshold. The affinity threshold may have any suitable value, for example, greater than or equal to 0.25, 0.5, 0.75, or 095.

Figure 7:
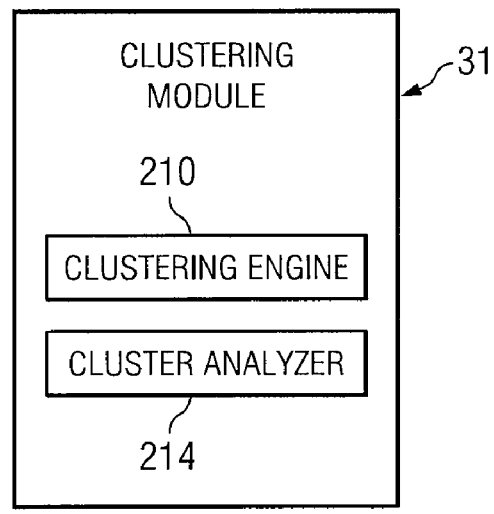
FIG. 7 illustrates one embodiment of a clustering module that may be used with the system of FIG. 1.

FIG. 7 illustrates one embodiment of clustering module 31 that may be used with system 10 of FIG. 1. In particular embodiments, clustering module 31 discovers patterns in data sets by identifying clusters of related elements in the data sets. In particular embodiments, clustering module 31 may identify clusters of a set of words (for example, a language or a set of pages 50). In general, words of a cluster are highly related to each other, but not to words outside of the cluster. A cluster of words may designate a theme (or topic) of the set of words.

In particular embodiments, clustering module 31 identifies clusters of related words according to the affinities among the words. In the embodiments, words of a cluster are highly affine to each other, but not to words outside of the cluster. In one embodiment, words may be regarded as highly affine if they are sufficiently affine. Words may be sufficiently affine if they satisfy one or more affinity criteria (such as thresholds), examples of which are provided below.

Any suitable affinity may be used to identify clusters. In particular embodiments, clustering module 31 uses directional affinity. The directional affinity of a word with respect to other words characterizes the word's co-occurrence. A cluster includes words with similar co-occurrence. In certain embodiments, clustering module 31 uses differential affinity. Differential affinity tends to removes bias caused by the general tendency of a word to occur in pages 50

In the illustrated embodiment, clustering module 31 includes a clustering engine 210 and a clustering analyzer 214. Clustering engine 210 identifies clusters of word according to affinity, and clustering analyzer 214 applies affinity clustering to analyze a variety of situations.

Clustering engine 210 may identify clusters of words according to affinity in any suitable manner. Three examples of methods for identifying clusters are presented: building a cluster from a set of words, sorting words into clusters, and comparing affinity vectors of words. In one embodiment, clustering engine 210 builds a cluster from a set of words. In one example, clustering engine 210 builds a cluster S from a set W of words $\{w_i\}$ with affinities *Aff($w_i$, $w_j$). Affinity value *Aff($w_i$, $w_j$) represents any suitable type of affinity of word $w_i$ with respect to word $w_j$, such as directional affinity DAffinity($w_i$, $w_j$) or differential affinity DiffAff($w_i$, $w_j$). Certain examples of affinity values provided here may be regarded as normalized values. In the example, $\text{Aff}_{for}(w_i, w_j)$ represents forward affinity, and $\text{Aff}_{back}(w_j, w_i)$ represents backward affinity.

In the example, cluster S starts with a seed word $w_q$. The current word $w_x$ represents a word of cluster S that is being compared with a word from set W at the current iteration. Initially, current word $w_x$ is set to seed word $w_q$.

During an iteration, current word $w_x$ is set to a word of cluster S. Words $w_i$ of set W are sorted according to their forward affinity $\text{Aff}_{for}(w_i, w_x)$ with current word $w_x$. Starting at the beginning of the sorted set W, candidate words $w_c$ that meet affinity criteria are identified. The affinity criteria may comprise a forward affinity with the current word $w_x$ criterion:

$$\text{Aff}_{for}(w_c, w_x) > Th_{cf}$$

and a backward affinity with the seed word $w_q$ criterion:

$$\text{Aff}_{back}(w_q, w_c) > Th_{cb}$$

where $Th_{cf}$ represents a forward threshold for a candidate word, and $Th_{cb}$ represents a backward threshold for a candidate word. The first words of an ordered set of candidate words $\{w_c\}$ are added to the cluster S, the number of added words given by the parameter $Size_c$. Thresholds $Th_{cf}$ and $Th_{cb}$ may be floating point parameters with any suitable values ranging from a minimum value to a maximum value. In certain examples, suitable values of $Th_{cf}$ and $Th_{cb}$ may be determined from a rank-ordered list of actual affinities. For example, the $200^{th}$ value in the list may be used. Parameter $Size_c$ may be an integer parameter with any suitable value. Examples of suitable values include a default value of 1, 2, 3, or 4. In particular embodiments, the parameters may be varied at certain iterations.

Any suitable number of iterations may be performed. In one example, the number of iterations may be designated prior to initiation of the method. In another example, the number may be calculated during the performance of the method. For example, the number may be calculated from the growth rate of the size of cluster S.

In another embodiment, clustering engine 210, identifies clusters by sorting words of a set of words into clusters. In one example, the words $\{w_i\}$ of set W are sorted according to affinities *Aff($w_i$, $w_j$), such as differential or directional affinities. In another example, the words $\{w_i\}$ are sorted according to an aggregation function, such as the sum, of affinities of word $w_i$ to each member of a distinct set of words Q. Set W may be selected in any suitable manner. For example, set W may be the X words most relevant to a query, where X may have any suitable value, such as a value in the range from 10 to 100, 100 to 200, or 200 or greater.

In the example, the clusters are initially empty. A first word $w_i$ from set W is placed in a cluster. At each iteration, a current word $w_x$ is selected from set W. Current word $w_x$ is placed into a cluster if *Aff($w_x$, $w_f$) satisfies an affinity criterion given by an affinity threshold Th, where $w_f$ represents the first word placed in the cluster. Threshold Th may have any suitable value, for example, a value in the range of 0.1 to 0.5 for a minimum value of 0.0 and a maximum value of 1.0. If *Aff($w_x$, $w_f$) does not satisfy threshold Th, current word $w_x$ is placed into an empty cluster. The iterations are repeated for each word of set W.

After processing the words of set W, small clusters may be eliminated. For example, clusters with less than Y words may be eliminated. Y may have any suitable value, such as a value in a range of 3 to 5, 5 to 10, 10 to 25, 25 to 50, or 50 or greater.

If the number of clusters is not within a satisfactory range, the process may be repeated with a different value of threshold Th that yields a stricter or looser criterion for placement in a cluster. The satisfactory range may be given by a cluster number minimum and a cluster number maximum having any suitable values. Examples of suitable values include values in the range of 1 to 5, 5 to 10, or 10 or greater for the minimum, and values in the range of 10 to 15, 15 to 20, or 20 or greater for the maximum. The value of threshold Th may be increased to increase the number of clusters, and may be decreased to decrease the number of clusters.

In another embodiment, clustering engine 210 identifies clusters by comparing affinity vectors of words. In certain embodiments, the rows and columns of affinity matrix can yield affinity vectors $<w_i, *\text{Aff}(w_i, w_l), \ldots, *\text{Aff}(w_i, w_j), \ldots, *\text{Aff}(w_i, w_n)>$, which represents the affinity of word $w_i$ with respect to words $w_j$, $j=1, \ldots, n$. Affinity value *Aff($w_i$, $w_j$) represents any suitable type of affinity of word $w_i$ with respect to word $w_j$, for example, directional affinity or differential affinity.

In particular embodiments, affinity vectors with similar affinity values may indicate a cluster. For descriptive purposes only, an affinity vector may be regarded as coordinates of the affinity of a word in affinity space. That is, each affinity value *Aff($w_i$, $w_j$) may be regarded as a coordinate for a particular dimension. Affinity vectors with similar affinity values indicate that the words with which the vectors are associated are close to each other in affinity space. That is, the vectors indicate that the words have similar affinity relationships with other words and thus may be suitable for membership in the same cluster.

Affinity vectors may be similar if one affinity vector is proximate to the other affinity vector as determined by a suitable distance function. The distance function may be defined over the affinity vectors as, for example, the standard Euclidian distance for vectors of the given size, or as the cosine of vectors of the given size. The distance function may be designated by clustering engine 210 or by a user.

In particular embodiments, clustering engine 210 applies a clustering algorithm to identify affinity vectors with values that are proximate to each other. Examples of clustering algorithms include direct, repeated bisection, agglomerative, biased agglomerative, and/or other suitable algorithms. In one example, clustering engine 210 may include clustering software, such as CLUTO.

Clustering analyzer 214 may use affinity clustering for analysis in any suitable application. In one embodiment, clustering analyzer 214 may use affinity clustering to categorize pages 50. A category may be associated with a cluster identifier or one or more members of a cluster. In one example, clusters of a page 50 may identified, and then the page 50 may be categorized according to the clusters. In another example, important words of a page 50 may be selected, and then clusters that include the words may be located. The page 50 may then be categorized according to the located clusters.

In one embodiment, clustering analyzer 214 may use affinity clustering to analyze corpuses of pages 50. A corpus may be associated with a particular subject matter, community of one or more individuals, organization, or other entity. In one example, clustering analyzer 214 may identify clusters of a corpus and determine a corpus character of the corpus from the clusters. The corpus character may indicate the words relevant to the entity associated with the corpus. If one or more pages 50 have clusters of the corpus character, the pages 50 may be relevant to the entity.

In one embodiment, clustering analyzer 214 may use affinity clustering for search query disambiguation and expansion. In the embodiment, clustering analyzer 214 identifies clusters that include the search terms of a given search query. The clusters provide alternate words and/or categories relevant to the given search query. In one example, words from a cluster may be reported to a searcher to help with the next search query. In another example, clustering analyzer 214 may select words from the clusters and automatically form one or more new search queries. Clustering analyzer 214 may run the new queries in serial or parallel.

In one embodiment, clustering analyzer 214 may use affinity clustering to study a social network. In one example, pages 50 may provide insight into a social network. Examples of such pages include correspondence (such as letters, emails, and instant messages), memos, articles, and meeting minutes. These pages 50 may include words comprising user identifiers (such as names) of people of a social network. Clusters of names may be identified to analyze relationships among the people of the network. In one example, differential affinity clustering may be used to filter out names that appear most pages 50 without providing information, such as names of system administrators.

In particular embodiments, clustering analyzer 214 may analyze data sets by combining and/or comparing the clusters of the data sets. In one embodiment, clusters of overlapping data sets are compared. Clusters from one data set may be mapped to clusters of the other data set, which may provide insight into the relationships between the data sets. For example, the data sets may be from an analysis of documents of a group of colleagues and from a social networking study of the group. A social network cluster may be mapped to a document subject matter cluster to analyze a relationship between the social network and the subject matter.

Certain embodiments of the invention may provide one or more technical advantages. A technical advantage of one embodiment may be that clusters of words are identified from the affinities between the words. A cluster includes words that are sufficiently affine with each other, where sufficient affinity is determined according to one or more affinity criteria. Another technical advantage of one embodiment may be that a clustering analysis may be performed. Examples of clustering analyses include categorizing a page according to the clusters of the page, determining a character of a corpus from the clusters of the corpus, and analyzing users based on the clusters in the users' documents. Certain embodiments of the invention may include none, some, or all of the above technical advantages. One or more other technical advantages may be readily apparent to one skilled in the art from the figures, descriptions, and claims included herein.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the following claims.

What is claimed:

1. A method comprising:
accessing, by one or more processors, a record to perform a clustering analysis, the record stored in one or more tangible storage media, the record recording a plurality of affinities, an affinity calculated using a directional affinity between a first word and a second word describing a quantitative relationship between the first word and the second word, the directional affinity indicating the probability of the occurrence of the second word given the occurrence of the first word;
identifying, by the one or more processors, a plurality of clusters of a plurality of words according to the plurality of affinities, a cluster comprising two or more words that are sufficiently affine with each other, a first word sufficiently affine with a second word if the affinity between the first word and the second word satisfies one or more affinity criteria comprising a forward affinity with a current word criterion and a backward affinity with a seed word criterion, the identifying comprising building a cluster by:
placing a seed word in the cluster; and
repeating the following for each word added to the cluster:
sorting the plurality of words according a forward affinity between the each word and a current word, identifying one or more candidate words satisfying the one or more affinity criteria, and placing the one or more candidate words in the cluster;
performing, by the one or more processors, the clustering analysis using the clusters to yield a result; and
reporting the result of the clustering analysis.

2. The method of claim 1, the affinity further comprising an affinity selected from a set consisting of, a directional affinity and a differential affinity.

3. The method of claim 1, the identifying the plurality of clusters of the plurality of words according to the plurality of affinities further comprising sorting the words into the clusters by repeating the following for each word of the plurality of words:
if the affinity between the each word and a first word of a cluster satisfies an affinity threshold, placing the each word in the cluster; and
otherwise, placing the each word in an empty cluster.

4. The method of claim 1, the identifying the plurality of clusters of the plurality of words according to the plurality of affinities further comprising comparing a plurality of affinity vectors of the words by:
obtaining the plurality of affinity vectors recording the affinity values, an affinity vector associated with a word and comprising a plurality of affinity values, an affinity value indicating the affinity between the associated word and another word;
identifying a set of affinity vectors that are proximate to each other; and
placing the words associated with the set of affinity vectors in a cluster.

5. The method of claim 1, the performing the clustering analysis using the clusters to yield the result further comprising categorizing a page comprising the plurality of words according to the clusters.

6. The method of claim 1, the performing the clustering analysis using the clusters to yield the result further comprising categorizing a page according to the clusters by:
selecting one or more important words of the page;
determining one or more clusters of the plurality of clusters that include the one or more important words; and
categorizing the page according to the one or more clusters.

7. The method of claim 1, the performing the clustering analysis using the clusters to yield the result further comprising determining a corpus character of a corpus comprising the plurality of words according to the clusters.

8. The method of claim 1, the performing the clustering analysis using the clusters to yield the result further comprising:
    determining one or more clusters of the plurality of clusters that comprise one or more search terms of a given search query;
    selecting one or more words from the one or more clusters; and
    reporting the selected one or more words.

9. The method of claim 1, the performing the clustering analysis using the clusters to yield the result further comprising:
    determining one or more clusters of the plurality of clusters that comprise one or more search terms of a given search query;
    selecting one or more words from the one or more clusters; and
    generating one or more next search queries from the selected one or more words.

10. The method of claim 1, the performing the clustering analysis using the clusters to yield the result further comprising analyzing a social network of people, each person associated with a user identifier, the words comprising the user identifiers, the social network analyzed by:
    determining one or more relationships among the people according to the clusters.

11. The method of claim 1:
    the accessing the record stored in the one or more tangible storage media further comprising:
        accessing the affinity values generated from a plurality of data sets, the plurality of data sets comprising the plurality of words;
    the identifying the plurality of clusters of the plurality of words according to the plurality of affinities further comprising:
        identifying a cluster set for each data set; and
    the performing the clustering analysis using the clusters to yield the result further comprising:
        comparing a first cluster set of a first data set with a second cluster set of a second data set to analyze a relationship between the first data set and the second data set.

12. One or more non-transitory computer-readable tangible media encoding software operable when executed to:
    access a record to perform a clustering analysis, the record recording a plurality of affinities, an affinity calculated using a directional affinity between a first word and a second word describing a quantitative relationship between the first word and the second word, the directional affinity indicating the probability of the occurrence of the second word given the occurrence of the first word;
    identify a plurality of clusters of the plurality of words according to a plurality of affinities, a cluster comprising two or more words that are sufficiently affine with each other, a first word sufficiently affine with a second word if the affinity between the first word and the second word satisfies one or more affinity criteria comprising a forward affinity with a current word criterion and a backward affinity with a seed word criterion, the identifying comprising building a cluster by:
        placing a seed word in the cluster; and
        repeating the following for each word added to the cluster: sorting the plurality of words according a forward affinity between the each word and a current word, identifying one or more candidate words satisfying the one or more affinity criteria, and placing the one or more candidate words in the cluster;
    perform the clustering analysis using the clusters to yield a result; and
    report the result of the clustering analysis.

13. The non-transitory computer-readable tangible media of claim 12, the affinity further comprising an affinity selected from a set consisting of a directional affinity and a differential affinity.

14. The non-transitory computer-readable tangible media of claim 12, the software further operable to identify the plurality of clusters of the plurality of words according to the plurality of affinities by sorting the words into the clusters by repeating the following for each word of the plurality of words:
    if the affinity between the each word and a first word of a cluster satisfies an affinity threshold, placing the each word in the cluster; and
    otherwise, placing the each word in an empty cluster.

15. The non-transitory computer-readable tangible media of claim 12, the software further operable to identify the plurality of clusters of the plurality of words according to the plurality of affinities by comparing a plurality of affinity vectors of the words by:
    obtaining the plurality of affinity vectors recording the affinity values, an affinity vector associated with a word and comprising a plurality of affinity values, an affinity value indicating the affinity between the associated word and another word;
    identifying a set of affinity vectors that are proximate to each other; and
    placing the words associated with the set of affinity vectors in a cluster.

16. The non-transitory computer-readable tangible media of claim 12, the software further operable to perform the clustering analysis using the clusters to yield the result by categorizing a page comprising the plurality of words according to the clusters.

17. The non-transitory computer-readable tangible media of claim 12, the software further operable to perform the clustering analysis using the clusters to yield the result by categorizing a page according to the clusters by:
    selecting one or more important words of the page;
    determining one or more clusters of the plurality of clusters that include the one or more important words; and
    categorizing the page according to the one or more clusters.

18. The non-transitory computer-readable tangible media of claim 12, the software further operable to perform the clustering analysis using the clusters to yield the result by determining a corpus character of a corpus comprising the plurality of words according to the clusters.

19. The non-transitory computer-readable tangible media of claim 12, the software further operable to perform the clustering analysis using the clusters to yield the result by:
    determining one or more clusters of the plurality of clusters that comprise one or more search terms of a given search query;
    selecting one or more words from the one or more clusters; and reporting the selected one or more words.

20. The non-transitory computer-readable tangible media of claim 12, the software further operable to perform the clustering analysis using the clusters to yield the result by:
    determining one or more clusters of the plurality of clusters that comprise one or more search terms of a given search query;
    selecting one or more words from the one or more clusters; and generating one or more next search queries from the selected one or more words.

21. The non-transitory computer-readable tangible media of claim 12, the software further operable to perform the clustering analysis using the clusters to yield the result by analyzing a social network of people, each person associated with a user identifier, the words comprising the user identifiers, the social network analyzed by:
   determining one or more relationships among the people according to the clusters.

22. The non-transitory computer-readable tangible media of claim 12, the software further operable to:
   access the record stored in the one or more tangible storage media by:
   accessing the affinity values generated from a plurality of data sets, the plurality of data sets comprising the plurality of words;
identify the plurality of clusters of the plurality of words according to the plurality of affinities by:
   identifying a cluster set for each data set; and perform the clustering analysis using the clusters to yield the result by:
   comparing a first cluster set of a first data set with a second cluster set of a second data set to analyze a relationship between the first data set and the second data set.

* * * * *